Aug. 10, 1965     J. RABINOW     3,200,194
READING MACHINE WITH MULTIPLE INPUTS
Filed May 22, 1962     3 Sheets-Sheet 1
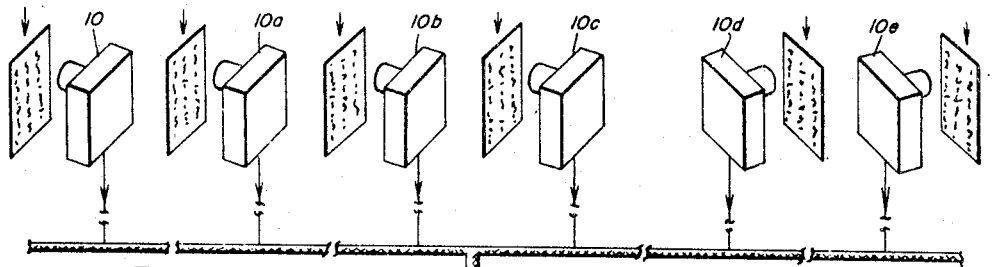
Fig. 1
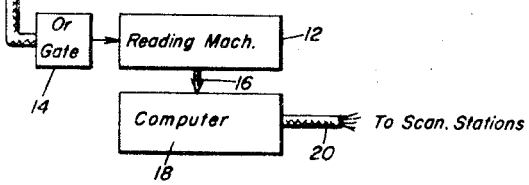
Fig. 2
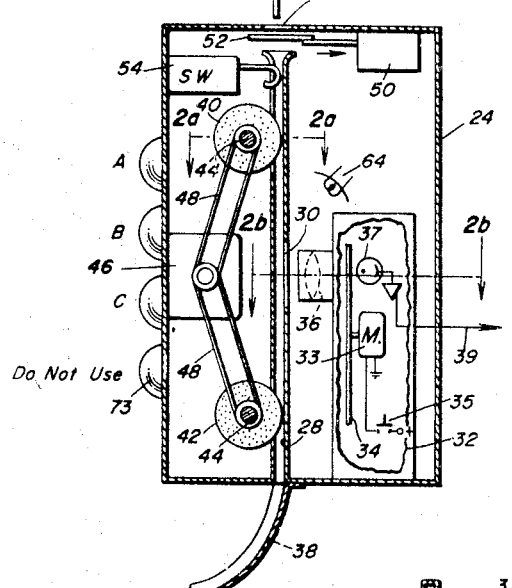
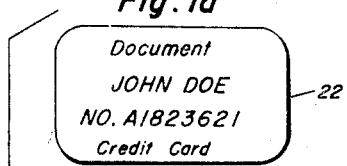
Fig. 1a
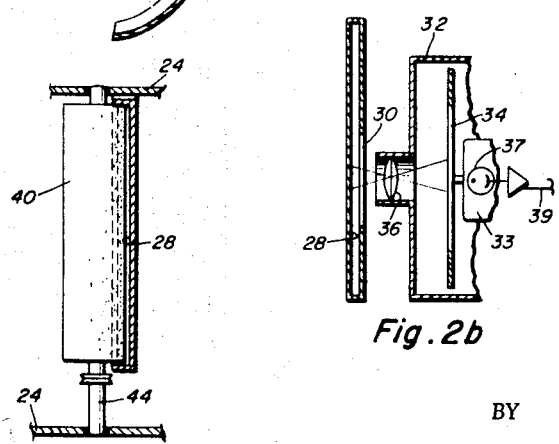
Fig. 2a     Fig. 2b
INVENTOR
Jacob Rabinow
BY Joseph A. Genovese & Max L. Libman
ATTORNEYS

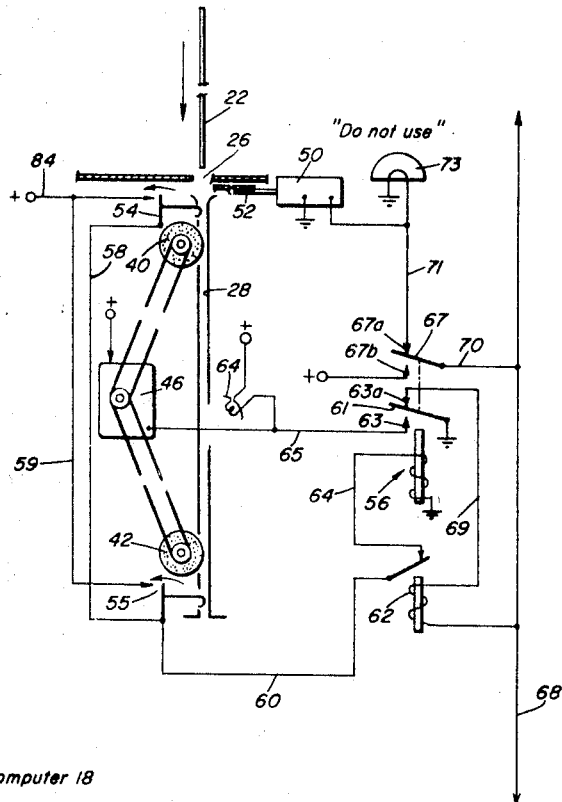
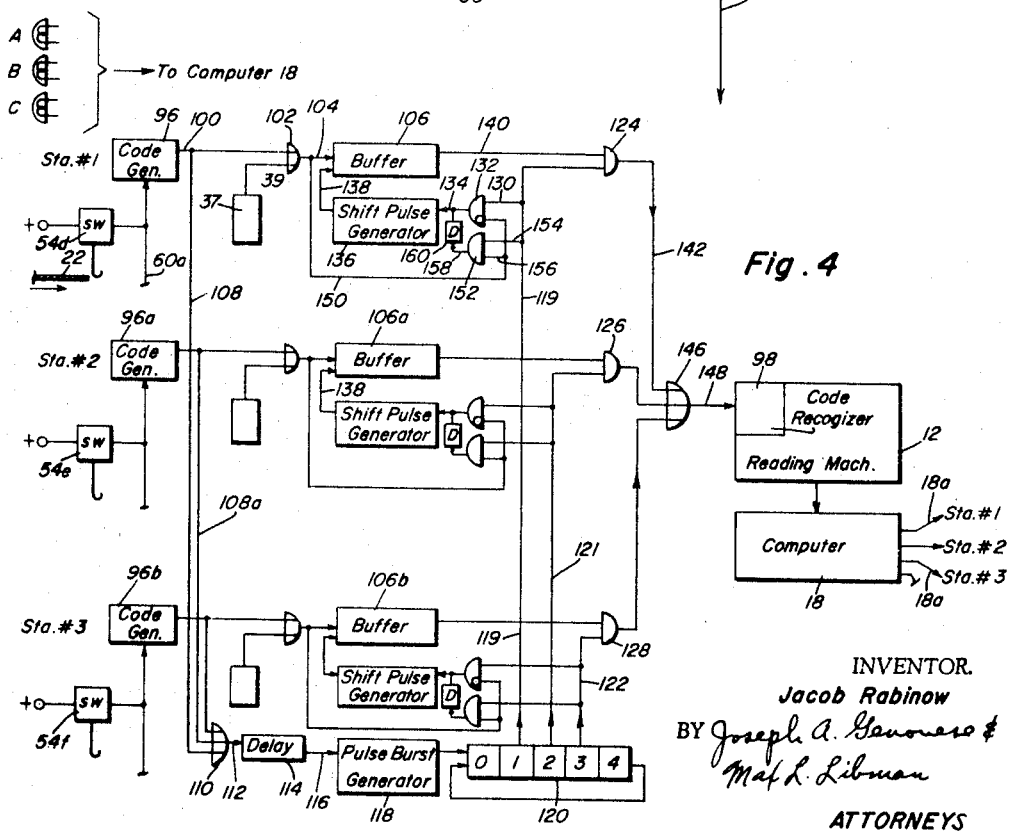

Aug. 10, 1965   J. RABINOW   3,200,194
READING MACHINE WITH MULTIPLE INPUTS
Filed May 22, 1962   3 Sheets-Sheet 3
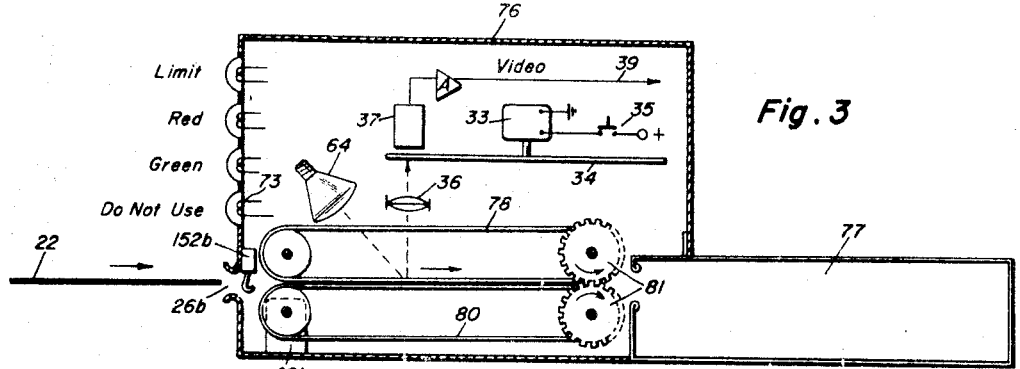
Fig. 3
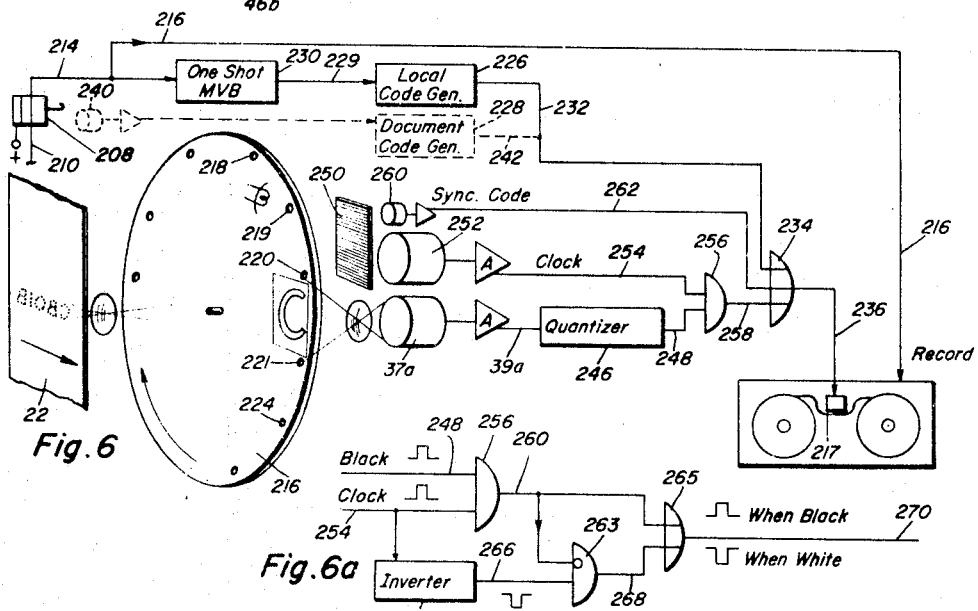
Fig. 6
Fig. 6a
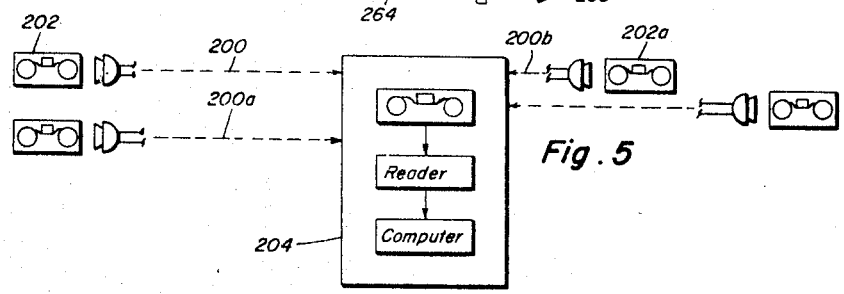
Fig. 5
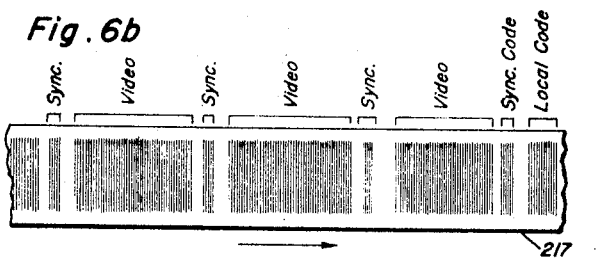
Fig. 6b
INVENTOR.
Jacob Rabinow
BY *Joseph A. Genovese &*
*Max L. Libman*
ATTORNEYS

United States Patent Office 3,200,194
Patented Aug. 10, 1965

3,200,194
READING MACHINE WITH MULTIPLE INPUTS
Jacob Rabinow, Takoma Park, Md., assignor, by mesne assignments, to Control Data Corporation, Minneapolis, Minn., a corporation of Minnesota
Filed May 22, 1962, Ser. No. 196,773
10 Claims. (Cl. 178—6)

This invention relates to reading machine systems and particularly to a system to increase the usefulness of character reading machines.

Electronic reading machines are excellent computer input devices because they are fast and can be adjusted to be very accurate. They can be used "on line" to eliminate the step of manually encoding information (for example, punching cards or tape) to be fed into the computer. Even when the reading machine is used "off line," it can be made to punch cards, paper tape, prepare magnetic tapes, etc. much faster and much more accurately than manual or several other encoding procedures.

However, one of the drawbacks of a reading machine is its original cost. For some uses of a reading machine the speed and accuracy benefits more than justify the original cost. But other possible uses of reading machines cannot justify the original cost. One such application is where there are a comparatively few documents to be read and/or where the documents are at widely scattered places. My present invention provides a solution to this problem.

As an example, consider credit buying in a department store having a number of sales stations. This is an ideal application for electronic reading machines because reading machines and computers with which reading machines are ordinarily directly or indirectly associated, are exceedingly fast. If a reading machine were installed at each sales station in the department store, the clerk could insert a document (credit card in this case) into the reading machine, and the outputs of the reader would be practically instantaneously fed into a central computer. The computer could then look up credit information regarding the account of the prospective customer and flash back the results to the reading station, to inform the clerk whether or not the credit sale should be made and whether there are any limitations of credit which should be applied. A major difficulty with such a system is that a reading machine at each sales station would be prohibitively expensive.

An object of my present invention is to provide a system by which a central reading machine can be used just like a central computer. In my system each reading station is equipped with a document-scanner which transmits information (called "video" or "video signals" hereafter), pertaining to the document, to the central reading machine enabling it to process the video to a form suitable for feeding into a computer. In some forms of my system, computer-result signals are fed back to the information-originating station. Thus, with my system, a department store installation becomes economically practical, as the most expensive portions of the reading machine are not duplicated at each reading station. On the contrary, the only assembly at each station is the inexpensive scanner and minor circuitry.

The above department store application of my invention is merely one example of many other possible uses of the basic system. For instance, the credit buying of a complex of single or plural businesses can be continually monitored and serviced by a central reading machine-computer installation, where the data is fed to the reading machine by way of telephone or other kinds of communication links. What was said about credit-lookup applies equally well to insurance company business affairs, banking and lending institutions where current balances can be looked up and new data recorded in a matter of seconds, etc. instead of the now usual practice of using telephone, postal, or other communication between one point (e.g., a teller's window) and another (e.g., the bank's bookkeeping department).

Accordingly, a broader objective of my invention is to increase the commercial usefulness of a reading machine by providing multiple scanners for the machine and locating them at widely (or closely) separated places which may be remote from the machine.

In some forms of my system more than one scanner should not concurrently feed a message into the reading machine in the absence of special provisions in the reader itself. Although there are many ways to avoid multiple concurrence of messages, the simpler methods are to disable in some way all scanners (or their outputs) except the one which is in use, or to permit all scanners to scan documents and buffer the messages, either at the scanner (e.g., by a punched paper or magnetic tape buffer), or at the reading machine itself. After buffering, the video signals can be fed into the reading machine circuits in turn or in any desired sequence.

Therefore, a further object of my invention is to provide a reading machine system having multiple input devices for the machine, where there are means to prevent scrambling of the incoming messages by (a) buffering at the scanners or at the reading machine, or (b) preventing a scanner from being either used or effective while another scanner is in use.

In addition to the system aspect of my invention, I have provided a new concept of document handling and examination for a reading machine, where the scanner is a self-contained unit capable of being located remotely from the reading machine.

A further object of the invention is to provide a document scanning device as above, with means to manifest results of a computer operation for the data of the scanned document.

Other objects and features will become apparent in following the description of the illustrated forms of the invention.

FIGURE 1 is a schematic view showing my system, where separate scanners are used to examine documents and feed data derived from the document to a central reading machine-computer station.

FIGURE 1a shows a group of documents, any one or more of which can be examined by the scanners at the examination stations of my system.

FIGURE 2 is a vertical sectional view of a scanner in accordance with my invention.

FIGURES 2a and 2b are sectional views taken approximately on the lines 2a—2a and 2b—2b respectively of FIGURE 2.

FIGURE 2c is a schematic wiring diagram showing one method of interconnecting a plurality of scanners to lock out all scanners except the one being used.

FIGURE 3 is a horizontal sectional view looking downward into a modification of my scanner.

FIGURE 4 is a logic circuit showing how all of the scanners can remain receptive to documents and yet, the data derived at the stations held discrete as it is fed into the circuits of the reading machine.

FIGURE 5 is a diagrammatic view showing the use of my invention with a telephone, micro wave, radio, etc. communication link.

FIGURE 6 is a schematic view showing a modification which is especially suited for communicating with a central reading machine-computer station by way of a telephone, micro wave, radio, etc., link.

FIGURE 6a is a view showing a logic circuit which can be used at each scanner station to complete the video signals, or which can be used at the central reading machine to service all of the scanners.

FIGURE 6b is an enlarged fragmentary view showing a part of a magnetic tape with recorded "local" code, sync codes, and video codes. The tape can be formed at the scan station or at the reading machine-computer station.

In the accompanying drawings FIGURE 1 shows a typical installation of my system where there are separate reading stations 10–10e inclusive feeding a central reading machine 12 through an Or gate 14. The outputs of the reading machine are conducted over the wires of cable 16 to a conventional computer 18 whose outputs are available on the wires of cable 20. In those cases where it is desirable or necessary to feed information back from computer 18 to the reading station, the wires in cable 20 are connected to do this, as will be discussed later.

Although my invention can be applied in many environments, one of the major benefits of my invention accrues where it is inconvenient to carry documents to the reading machine proper. FIGURE 1a shows a credit or charge card 22 as one possible document. Other documents are conventional insurance documents or sales slips which can be read by machine for accounting purposes, bank books or other documents having a bank account number and a ticket ordinarily found on articles of clothing which is used for inventory control. After a sale is consummated, the clerk can place the inventory control ticket into one of my scanning devices to record an inventory reduction of a given item. Such tickets or slips need not necessarily be associated with clothing; they may be associated with other articles. These and numerous other kinds of documents can be scanned at various reading stations 10–10e for feeding into a central reading machine.

FIGURE 2 shows scanning device 24 as one possible configuration to service the requirements of one of the reading stations in FIGURE 1. Scanner 24 can be a low-speed device in comparison to the usual rates of reading machine scanners. For example, the characters in the account number of credit card 22 can be read in a second. Assume that it requires another second or two to process the video derived from the card 22; in a matter of two or three seconds from the time of insertion of card 22 in device 24, information can be manifested at the reading station concerning the credit of the customer.

Scanner 24 is made of a housing having a top wall provided with an entrance slot 26 for card 22. The slot is registered with an open ended card-guide 28 having width and thickness dimensions to guide the card in a prescribed path. FIGURE 2b shows guide 28 made of rectangular cross section with an opening 30 in one wall which is aligned with the optical system of the scanner proper 32. Although various kinds of conventional scan members or assemblies can be used for scanning the line of characters on card 22 (e.g., as in Patent No. 3,104,369), I have illustrated a conventional scanning disc 34 on which the images of the characters are formed by lens 36 of the optical system. Motor 33 rotates disc 34 at a known speed so that the scan holes (e.g., like those of FIGURE 6) scan the character image whereby the photocell 37 provides amplified video on line 39. Motor 33 can be operated on demand, continually or manually as by switch controlled circuit 35.

It is possible to drop card 22 into the entrance 26 and allow it to be gravitationally pulled down through the card-guide 28 into the chute 38 where it can be recovered by the clerk. As the card moves past the optical system of the scanner, the characters in the account number line (or any other line or lines) are examined by the scanner. However, since the card would be accelerating as it passed the scanner, it is better to use a positive drive for the card to propel it through card guide 28. Therefore, I have shown two resilient rollers 40 and 42, each mounted on its spindle 44 (FIG. 2a) supported, for example, in bearings pressed in (or attached to) the opposite walls of the housing of device 24. A part of the surface of each roller projects into the passageway defined by the walls of guide 28. The rollers are driven at a predetermined speed, for instance by motor 46, a reducer (not shown), and belt drives 48 connected to the rollers and to the shaft of the reducer. Obviously, an endless conveyor can be substituted for the rollers.

FIGURE 2c shows how scanning device 24 can be electrically connected with other similar devices so that when one scanning device is being used the others are locked out. The circuit for one device 24 is shown, and the others (not shown) are similar. The embodiment of FIGURE 2c locks out the unused scanners by a closure plate 52 which covers the entrance to guide 28. The closure plate 52 merely shows that I can use mechanical means to lock out each unused scanner. As mentioned later, the closure plate can be omitted. When a positive closure is used for lock out, I can operate the plate 52 by a push solenoid 50 attached to a wall of the scanner case with closure plate 52 secured to the solenoid armature. When the solenoid is in the non-actuated position (top of FIGURE 2c) the closure plate is withdrawn from registry with the inlet slot 26 and mouth of the card guide 28. When actuated, the solenoid moves plate 52 in a card-blocking position between guide 28 and slot 26. Thus, the lockout feature of FIGURE 2c merely requires the solenoids 50 of all other scanners be actuated while one is being used as described below in connection with the circuit of FIGURE 2c.

Card operated switch 54 is so located that the switch operator (for instance, a thin wire) extends across guide 28 near its entrance. As card 22 is inserted, it closes switch 54 thereby connecting the coil of motor (46) control relay 56 with an electrical potential source via lines 84, 58, 60, switch 62, and lines 64 and 65. Relay 56 (and hence motor 46) should remain energized long enough to allow the card to be propelled through the card guide 28 by the drive rollers 40 and 42. Hence, I have card-operated switch 55 near the discharge end of guide 28. Switch 55 is connected in parallel with switch 54 by means of lines 58 and 59. Relay 56 has a movable contact 61 connected to ground, and fixed contacts 63 and 63a. The normal position (shown) is for contacts 61 and 63a to engage thereby establishing a circuit path from main bus 68 through the coil of switch 62, and wire 69 to ground. This path is described later; for now, when relay 56 is energized, the set of contacts 61, 63 close thereby grounding the circuits of motor 46 and light source 64 via line 65. Thus, motor 46 and light source 64 (to illuminate the document being scanned) are operative as long as either switch 54 or 55 is closed. When a document has passed through guide 28, both switches 54 and 55 will open, thereby opening the relay coil circuit, stopping motor 46 and extinguishing the light; and relay contacts 61, 63a will engage. Concurrently with the movement of contact 61 to contact 63, another movable contact 67 of the same relay moves from fixed contact 67a to fixed contact 67b which is connected to a potential source. Movable contact 67 is connected to a main bus 68 by line 70, conducting a signal to the bus which is impressed on the coil of the solenoid switches (or the equivalent corresponding to switch 62) of all other scanners thereby disabling all other scanners by opening their relay coil source potential lines corresponding to line 64 of FIGURE 2c. The signal on line 70, bus 68 does not affect the scanner being used because the ground path 69, 63a, 61 will be open at that time.

The push solenoid 50 for plate 52 is connected to ground and to contact 67a by line 71. Thus, when contacts 67, 67a are engaged, a signal on bus 68 from another scanner will actuate the solenoid by being conducted over lines 70 and 71, thereby closing the entrance 26 of the illustrated scanner. "Do Not Use" light 73 in parallel with solenoid 50 will also be energized. Light 73 is optional as is solenoid 50 and plate 52 for the following reason. Switch 62 which controls the coil-circuit of relay 56 prevents the relay from actuating (thereby preventing motor 46 from operating) when there is a signal on bus 68 from another scanner. Where positive card-feed is used (rollers 40, 42) the scanner will not accept a card while another scanner is in use.

As described before the scanner proper which provides video on line 39 to the central reading machine 12, is conventional, as is the balance of the reading machine and computer 18.

Some applications of my system require a "return" signal to the scanner 24, or at least, to the examination station where the scanner is located. Other uses of my invention, for example inventory control and accounting, do not necessarily require feedback information. Therefore, FIGURE 2, shows electric lights A, B, and C which can, for example, represent credit ratings. The decisions of the computer will be conducted in the form of an electrical signal to the appropriate electric light A, B, or C, over lines 18a (shown only in FIGURE 4, right side) to these lights, a printer, etc., as required.

Referring now to FIGURE 3, I have shown scanning device 76 which differs from device 24, although the ultimate purposes are identical. In this form, I use a horizontal casing with an open tray 77 to receive the discharged documents after scanning. The only other difference of consequence is the way that the card 22 is propelled. There are two adjacent endless belt systems 78 and 80 with the adjacent flights of the belts spaced apart sufficiently to receive and propel the cards. The belt system can be composed of a comparatively wide belt for system 80 and a pair of spaced narrower belts for system 78, leaving a space therebetween for scanning. Proper edging of the card for reading can be accomplished by side plates which correspond to the sides of the card-guide 28 shown in FIGURE 2b. Both of the conveyor systems 78 and 80 are interlocked, for example, by gearing together (as at 81) a pair of the conveyor belt rollers. Motor 46b, through a suitable reducer (not shown) is drivingly connected to another of the rollers of the conveyor system.

In the previously described scanning devices it was assumed that each device of the system could be directly connected (as by wires) to reading machine 12, and the decision of the computer directly fed back to the individual scanning station from which the scan data originated. Another way to feed video into the reading machine and return the computer decision to correct station is shown in FIGURE 4, and may be incorporated, if desired, with any of my scanners. In FIGURE 4, I show three document-operated switches 54d, 54e, and 54f which indicate respective scanning stations. Instead of relay circuits which are perfectly adequate in view of the comparatively low scanning speeds involved, I can use computer elements together with code generators 96, 96a, and 96b (e.g., resonant relays) at the respective stations. Each code generator will produce a code peculiar to its station so that it can be recognized by a conventional code recognizer 98 at or in the reading machine or computer. Consequently, the code can be used to instruct the computer to direct its decision to the station from which the scan data originated.

Consider the upper station in FIGURE 4. Switch 54d is connected to an electrical source and to a line 60a which corresponds generally to lines 58, 59, and 60 of FIGURE 2c. Therefore the signal conducted on line 60a, in addition to operating code generator 96, operates the motor for document propulsion, and the light source for scanning. The output line 100 of code generator 96 is Or gated at 102 with the video output line 39 of photocell 37. The gate output on line 104 is connected with the input terminal of a conventional buffer 106, whereby the code, followed by the video is gated into the buffer. For station #2, #3, etc. the same thing happens i.e., their individual codes followed by video are gated into the individual buffers (an obvious variation is to use one large capacity buffer). When the code generator 96 (or any other code generator) is actuated, its code is conducted on line 108 to the Or gate 110 (all lines 108, 108a, etc., being Or gated at 110) so that the output of the gate provides a signal on line 112 which is delayed at 114 and conducted on line 116 to a pulse-burst generator 118. The purpose of the pulse-burst generator is to step a shift register 120 whose output lines 119, 121 and 122 form individual inputs to And gates 124, 126, and 128 (for the three stations shown). In addition, the lines 119, 121 and 122 conduct signals which trigger the sequential unloading of buffers 106, 106a and 106b. Thus, when shift register 120 (lower part of FIGURE 4) steps to stage "one" there will be a standing signal on line 119 which is conducted over line 130 through inhibit gate 132 (mentioned again later) and over line 134 to the shift pulse generator 136. The output line 138 of generator 136 conducts shift pulses to buffer 106 to unload this buffer over line 140 to the gate 124 which is (because of the signal on line 119) satisfied to provide output signals on line 142 which correspond to the code and video which was stored in buffer 106. When shift register 120 steps to stage "two," buffer 106a is similarly unloaded. When the shift register shifts to the third stage, buffer 106b is unloaded. The output lines of each of the control gates 124, 126, and 128 for the three buffers are Or gated at 146, and the output line 148 of Or gate 146 is fed into the reading machine.

There is a fourth stage in shift register 120 for this reason: if video is being loaded into a buffer for instance buffer 106, at the time that the unload cycle for this buffer occurs, unloading is delayed until shift register 120 steps to stage "four" as follows: If there is a signal on line 104 at the time that a signal occurs on lines 119, 130, the signal on line 104 is fed over line 150 to the inhibit terminal of gate 132, inhibiting this gate so that the shift pulse generator 136 does not operate. Instead, And gate 152 becomes satisfied because one of its inputs on line 154 is from line 119 (connected to stage "one" of shift register 120) and the other of its inputs is on line 156 which is attached to line 150. The output line 158 of And gate 152 conducts a signal which is delayed at 160 and applied to line 134 which is connected to the trigger terminal for the pulse generator 136. Thus, the delayed signal on line 158, 134 triggers the shift pulse generator 136. By making the delays 160 for the various stations of proper duration, all of the delayed buffer shift pulse-groups can be sequenced.

Early in my description, I mentioned that the video can be conducted over the telephone lines, a radio or microwave channel, etc. This is especially important when it is impractical to use wire conductors to transmit the video directly into the reader, as where long distances are involved. Such "long" distances can be within a city, a state, the entire nation or a section thereof. FIGURE 5 shows telephone transmission lines 200, 200a, 200b, etc. interconnecting scanning stations 202, 202a, etc. (represented by recorders) with a central reader-computer station 204. Video transmission can rely on any conventional techniques, as a carrier modulated in any way, whose details form no part of my invention. FIGURE 5 represents a plurality of scanner stations where documents are scanned, the video recorded, and transmitted to central station 204. Recording (paper tape, magnetic, etc.) is optional in that the video could be directly transmitted, but recording before transmission offers numerous advantages, one of which eliminated is the problem of more than one scanner being used at the same time.

FIGURES 6 and 6a show a scanning device 206 whose document handling apparatus (not shown) can be like that of FIGURE 2 or 3 or constructed in other ways. Document-operated switch 208 corresponds to switch 54 of FIG. 2, providing a signal for the document mover (not shown) on line 210 when the switch is closed. Thus the signal on line 210 can be used to actuate recorder 212 by being conducted to its motor-control circuit over lines 214 and 216. The recorder (assume magnetic tape for the sake of brevity) is actuated only while a document is being scanned.

FIGURE 6b shows a fragment of magnetic tape 217 which has been formed by the scanner of FIGURE 6. Reading right-to-left, the first magnetic code on the tape is called a "local" code representing, for example, the office, station, etc. from which the video emanated. In place of or in addition to this code, this area of the tape could have a "document" code associated with the document itself. "Local" and "document" codes may represent any data as required or desired by the user of the system, and this will obviously be different for different businesses. For instance, the needs of an insurance company are different from those of a law enforcement agency.

Sync codes precede each video code on tape 217. All codes are recorded at audio speed in binary form although this is not essential. The video code shown, contains all of the video information derived from three scans of a character including its background (FIGURE 6a) although I recognize some advantage in having the video contain only the character-defining video without the background information. This feature is mentioned again later.

FIGURE 6 shows "local" and "document" code generators 226 and 228 operated by switch 208 and by a printed code on document 22 respectively. Code generator 226 is triggered by a signal over line 229 from one shot multi-vibrator 230 connected in line 214. The code from generator 226 is conducted on line 232, through Or gate 234 whose output on line 236 is impressed on (or modulates a carrier) the head of recorder 212. "Document" code generator 228 is keyed by an amplified signal from photocell 240 which examines document 22. Alternatively the photocell 240 can directly read a code (e.g. a bar code) on the document. In either case, the "document" code is conducted on lines 242 and part of line 232 or Or gate 234 to the head of recorder 212. When both local and document codes are used, lines 242 and 232 are preferably Or gated. "Local" and "document" codes are essentially computer instructions. Thus in a like manner, any other instructions can be recorded in the tape 217.

Scan disc 216 (like discs 34) has scan holes 218 . . . 224, etc., and is rotated at a predetermined speed. Images ("C" shown) of the characters on document 22 are formed by optical means (represented by a lens) on one face of disc 216. Each image is scanned by successive holes of the disc to enable photocell 37a to provide amplified video signals on line 39a. In this form of my invention I prefer to quantize the raw video, as at 246, so that the output signals on line 248 from the quantizer are well defined clean pulses. For convenience, assume that the photocell amplifier provides a positive going signal on line 39a when the photocell sees "black," i.e., a part of the character image. Also, assume that I want to examine each character at thirty vertical points during each sweep of one scan hole across the character image, and the timing of the paper motion and disc rotation allows twenty sweeps (vertical scans) per character. This means that six hundred bits are available to define each character on the tape. Packing density of three hundred bits per inch on the tape, is reasonable, whereby the video to define each character will require only two inches of tape. The sync codes require negligible tape length. These parameters are mentioned, but obviously they can be changed to suit a customer and/or specific system.

I can operate a multi-vibrator to obtain the thirty clock pulses per sweep of a disc hole over the character image, but this could introduce timing problems. So, I have a grating 250 made of thirty equally spaced opaque and transparent lines, and a photocell 252 behind the grating. The positioning of grating 250 requires a scan hole, say hole 219 to sweep across the lines of grating 250 as another hole (220) is sweeping across the character image. Thus, the amplified outputs on line 254 from photocell 252 are clock pulses which are And gated at 256 with the quantized "black" signals on line 248. When there is coincidence at gate 256 there is a ("black") video signal on line 258 which passes Or gate 234 to the recorder tape 217.

Since a sync code (see FIGURE 6b) precedes each video code for one scan line, a convenient way to develop the sync code is to use the upper part of grating 250. Thus, before scan hole 219 sweeps across the clock portion of grating 250 it sweeps across the sync code portion thereof. A separate photocell 260 is located behind the sync code portion of grating 250, and its output line 262 has an amplifier ahead of its connection with Or gate 234.

Summarizing to this point, the tape 217 is formed by the following sequence of steps.

(a) The "local" and/or "document" codes (or sundry read and/or computer instructions) are recorded when the document is inserted in the scanner by manual or automatic (not shown) means.

(b) Hole 219 traverses the sync code portion of grating 250 before hole 220 reaches the character scan area (occupied by the image of a C in FIGURE 6), to record the first sync code on the tape.

(c) Holes 219 and 220 concurrently scan the grating 250 and the character image respectively, and only the "black" video is recorded on the tape.

(d) By this time the hole 218 is ready to sweep across the sync code portion of grating 250, after which the hole 218 provides clock pulses and the hole 219 scans the character image.

By recording "black" signals only, the character image (only) is recorded with spaces left where "white" (the character background) signals would occur. These can be filled in with signals opposite polarity at the station 204 (FIGURE 5) for all scanners of the system by a circuit such as in FIGURE 6a or the equivalent, if desired. This circuit is so simple that each scanner could be equipped with such a circuit at a very low cost. When so used, the tape would be formed with complete video, i.e. the character and its background.

FIGURE 6a shows the And gate 256 of FIGURE 6 with its clock input line 254 and the "black" video line 248. Assume that when photocell 37a detects "black" (a part of the character image) a quantized positive (+) signal appears on line 248. Also assume that the clock signal is positive (+) and for digital recording on the tape a positive signal will record a binary "one" (black) and a negative (—) signal will record a binary "zero" (white). When there is coincidence at gate 256, the output on line 260 will be positive and will pass Or gate 262 to line 258a which corresponds to line 258 in FIGURE 6. The signal on line 260 inhibits Gate 263 so that it cannot conduct. Or gate 265 is capable of passing either positive going or negative going signals, e.g. which can be produced by a transformer with two primary windings in opposite directions or a transistor gate. When the photocell 37a fails to see "black" at the time of a clock pulse, gate 256 is not satisfied, whereby gate 263 is not inhibited. The clock pulse, through on line 254 is inverted at 264, conducted over line 266 and passes gate 263 to Or gate 265 via line 268. Thus, the output line 270 of gate 265 provides signals to Or gate 234 (FIGURE 6) which correspond to "white" (−) and "black" (+) to be recorded as video on the magnetic tape.

Line 236 (FIGURE 6) which is the video line, can be connected for direct transmission to station 204 or to form the tape 217 as shown. After a period, say at the end of a day, the formed tape can be played back over a transmission link (FIGURE 5) to the central station 204 where a new tape can be used as a buffer for all scanners serviced by the reading machine. The video received at station 204 is in binary (encoded) form, and it is so arranged that it can easily be displayed on a "memoscope" or a suitable display panel, e.g., an array of neon (or other) lamps, for any purpose depending upon the needs of the user of my system.

It is understood that changes may be made without departing from the protection of the following claims.

I claim:

1. In an optical character recognition system, a central character recognition machine, a plurality of optical scanning devices at spaced places remote from said character recognition machine to examine documents at separated locations and provide video signals corresponding to the individual characters on the documents for the central character recognition machine to process, means operatively connected with said devices to transmit the individual character video signals originating at each scanning device to said central machine, and means interconnecting said devices for preventing more than one device from concurrently providing video signals into said machine.

2. In an optical recognition machine system, a central character recognition machine, a plurality of optical scanners at spaced places remote from the machine to examine documents at separated locations and provide video signals for the central machine to process, means operatively connected with said scanners to transmit said video signals from each scanner to said central machine, means interconnecting said scanners for preventing more than one scanner from concurrently providing video signals to said central machine, each scanner having means to provide a local code, means at each scanner for manifesting information relating to the decisions of the character recognition pertaining to the document examined by a given scanner; and means responsive to said local code to provide information manifestation at the scanner from which the video signals originated.

3. An optical examination device for documents, said examination device including a housing having a document entrance into which documents are adapted to be manually inserted, a document conveyor in said housing, document-actuated means to control said conveyor, a document guide in communication with said entrance to constrain the movement of a document as it is passed through said entrance as the document is moved at a predetermined speed by said conveyor, a scanner in said housing to examine the characters of said document and provide video signals peculiar to the examined characters, storage means located at said device to temporarily to store said video signals, and means operatively connected with said storage means for unloading said storage means and conducting the stored video signals to a central reading machine.

4. In an optical character recognition system; a station provided with a central optical character recognition machine; a plurality of document examination devices including scanners located at spaced places remote from said central character recognition machine; said scanners, upon scanning the documents, providing video signals defining the characters on the documents at said spaced places; video signal buffer means; means to transmit said video signals to said buffer means; and buffer control means allowing single-message video signals to pass from said buffer means to said character recognition machine, and preventing video signals defining more than one message from being concurrently passed to said character recognition machine.

5. The system of claim 4 wherein said buffer control means have means to sequence the video signal messages read out from said buffer means.

6. The system of claim 4 and means connected with said machine at said station for feeding back a signal to the particular examination device from which a video signal was transmitted.

7. In an optical character recognition system provided with a central character recognition machine, and a plurality of examination devices to individually extract video information pertaining to characters on documents at diverse spaced places; said examination devices being located at spaced places remote from the central machine; and said central machine servicing all of said examination devices; at least one of said examination devices including a document guide to position the document, and a scanner including photosensitive means to provide video signals pertaining to the characters on the guide-positioned documents; means to provide a code peculiar to the said examination device from which said video signals originate; buffer storage means; and means for conducting both said video signals and said code into said buffer storage means for temporary storage prior to processing thereof by said central character recognition machine.

8. The subject matter of claim 7 and means operatively connecting a plurality of said examination devices for preventing video signals from more than one examination device from being simultaneously processed by said central machine.

9. In an optical reading machine system, a station provided with a central reading machine, a plurality of examination devices including means to provide sync codes, said devices including scanners providing video signals relating to characters on documents which are scanned at various locations, video signal buffer means, means to transmit said video signals to said buffer means, buffer control means allowing single message video signals to pass from said buffer means to said reading machine and preventing video signal defining more than one message from being concurrently passed to said reading machine, and means to transmit said sync codes to said reading machine in coordination with said video signals.

10. The system of claim 9 wherein there are means at said examination devices to transmit local device-identification codes to said station.

References Cited by the Examiner

UNITED STATES PATENTS

| | | | |
|---|---|---|---|
| 1,927,556 | 9/33 | Nelson | 179—7 |
| 2,294,809 | 9/42 | Smith | 178—6 |
| 2,561,197 | 7/51 | Goldsmith | 178—6.8 |
| 2,912,066 | 11/59 | Ellithorpe | 178—5.6 |
| 2,914,746 | 11/59 | James | 178—6 |
| 3,098,119 | 7/63 | Lemelson. | |
| 3,111,647 | 10/63 | Heizer | 178—6 |

DAVID G. REDINBAUGH, *Primary Examiner.*